F. S. ELLETT.

CLUTCH.

APPLICATION FILED OCT. 28, 1911.

Reissued Apr. 15, 1913. 13,554.

Witnesses
J. Adolph Bishop
B. M. Kent.

Inventor
Frederick S. Ellett.
by Foster Freeman Watson & Coit
Attorneys

UNITED STATES PATENT OFFICE.

FREDERICK S. ELLETT, OF ELMIRA, NEW YORK.

CLUTCH.

13,554. Specification of Reissued Letters Patent. Reissued Apr. 15, 1913.

Original No. 982,042, dated January 17, 1911, Serial No. 563,784. Application for reissue filed October 28, 1911. Serial No. 658,105.

*To all whom it may concern:*

Be it known that I, FREDERICK S. ELLETT, a citizen of the United States, residing at Elmira, in the county of Chemung and State of New York, have invented certain new and useful Improvements in Clutches, of which the following is a specification.

This invention relates more particularly to improvements in clutches for motor cycles, whereby the driving pulley is thrown into or out of engagement with the engine shaft; my object being to provide a simple and effective clutch for this purpose which may be actuated from the handle bar of the machine to take up the load gradually when throwing in the clutch.

Figure 4:
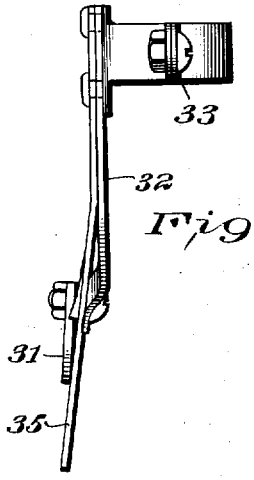
Figure 3:
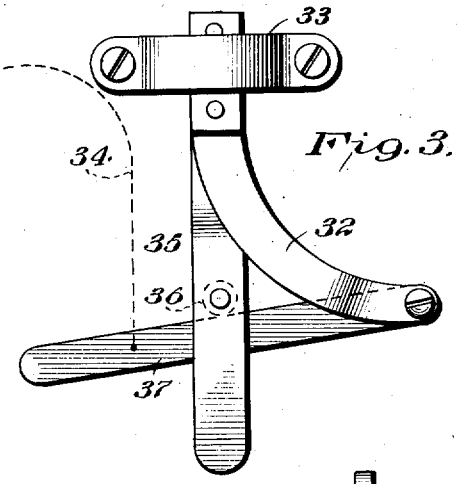
Figure 2:
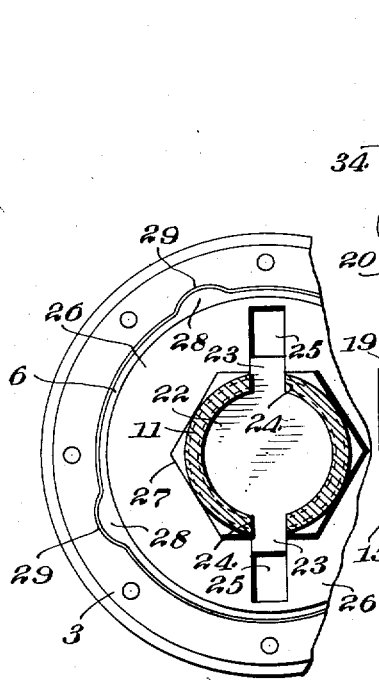
Figure 1:
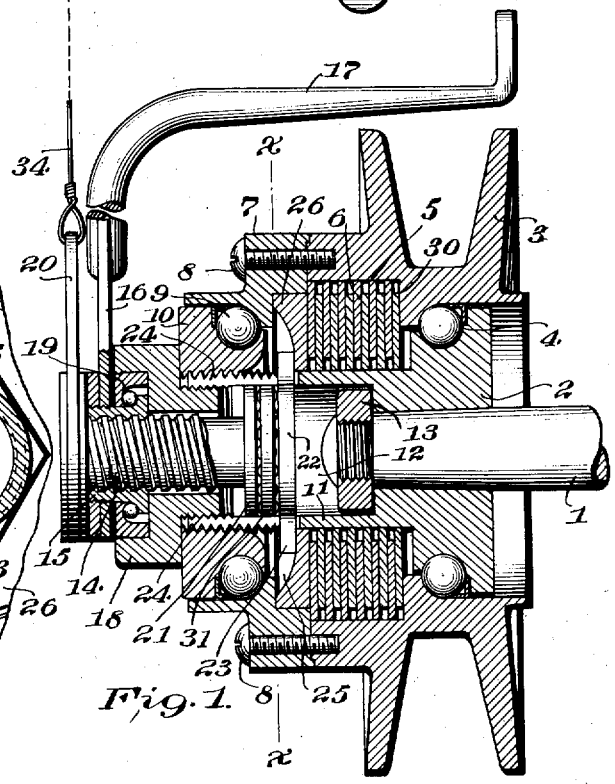

I attain my object by constructing the parts of the clutch and operating mechanism in the manner illustrated in the accompanying drawings in which, Figure 1 presents a sectional view of the clutch as attached to the end of the engine shaft; Fig. 2, a detail showing a portion of the clutch, sectioned on the line $x$—$x$ in Fig. 1, the cap piece 7 being removed; and Figs. 3 and 4 a plan view and side elevation, respectively, of the operating lever to be attached to one of the handles of the motor cycle.

Like numerals designate like parts in the several views.

To the end of the engine shaft 1, a hub 2 is rigidly fastened. Upon this hub the belt pulley 3 is mounted on the ball bearing 4. The pulley is chambered out at 5 to receive the multiple friction disks 6, and this chambered portion of the pulley is closed by a cap piece 7, which is fastened thereto by screws 8 after the clutch parts are assembled in the pulley chamber. This cap piece rides on a ball bearing 9 supported upon the adjustable cone 10 which is screw-threaded upon the outward end of the reduced portion 11 of the hub 2. This outward end of the hub is chambered at 12 to receive the lock nut 13 at the end of shaft 1, also to receive the setting-up mechanism of the clutch. This setting-up mechanism consists of a screw 14 having a double thread of steep pitch, which passes through a nut 15 held stationary by means of an arm 16 fastened by means of an offset 17 to the engine casing or other fixed frame or support. The nut 15 is held in place upon the end of the hub by means of a cap piece 18 screwed into the outward end of the chamber 12 against the outer face of the cone 10. The screw connection between this cap and the hub is left handed, so that when said cap is screwed up against the cone 10, after said cone has been properly adjusted, the two parts are securely locked in place. As the cap piece 18 rotates with the engine shaft, while the nut 15 is stationary, I provide a ball bearing at 19 between it and the nut. An operating arm 20 is fastened to the outward end of screw 14, and the inward end of this screw impinges against the disk 21, which in turn presses against a disk 22 provided with arms 23, which pass through slots 24 provided therefor at the outward end of the hub 2. The arms 23 engage the grooves 25 cut into the outward face of the disk 26, which is slidably mounted on the reduced portion 11 of the hub 2, the periphery of this portion of the hub being made hexagonal, as shown at 27 in Fig. 2, and the disk 26 being broached out hexagonally to fit the hub so as to be rotated thereby. Alternate friction disks 6 will also be fitted to this portion of the hub, while the intermediate disks will be coupled to the pulley shell by means of tongues 28 which project into grooves 29 formed at suitable intervals around the wall of the chamber 5, (see Fig. 2). The innermost friction disk engages a bearing surface 30 formed on the pulley at the inward end of the chamber 5. To avoid friction between disks 21 and 22, and to provide for the free running of the clutch when set up, a ball bearing disk 31 is inserted between these two disks.

To operate the clutch I provide on the handle bar of the motor cycle a lever 37 pivoted upon the end of an arm 32 fastened, by means of a clamp 33, to the underside of the handle bar, in position to be readily manipulated by the thumb or finger where the hand of the rider grips the handle. This lever is connected with the arm 20 by a flexible steel rod 34, which is conducted from the handle bar to the clutch by means of suitable guides (not shown) attached to the frame or other parts of the machine. To hold the lever 37 in a locked position when the clutch is set, I provide a flat spring 35, which extends from the clamp 33 over and beyond the lever, said spring being provided at 36 with an inclined catch over which the lever passes when setting the clutch, the spring causing said catch to snap in back of the lever when the clutch is fully set. To release the clutch, the spring 35 is pressed upward until the catch is freed from the lever. This relieves the tension on arm 20, and the pressure back of the screw 15 causes it to turn outward, by reason of the steep pitch of the threads. In setting the clutch, the lever 37 is gradually pulled backward over the catch, thereby slowly taking up the friction and imparting motion from the driving shaft to the pulley.

What I claim as my invention and desire to secure by Letters Patent is:—

1. The combination with a rotary shaft, of a hub fastened upon one end thereof, a concentric wheel mounted for free movement upon said hub, one or more friction disks connected to the hub positioned in a chamber provided therefor between the hub and wheel and adapted to engage a friction member or members on the wheel, a fixed nut mounted concentrically at the outward end of the hub, a screw passing through said nut, means for imparting a turning movement to said screw, and means rotating with the hub and actuated by the screw whereby the inward movement of the screw will be imparted to the friction disk or disks.

2. The combination with a rotary shaft, of a hub fastened upon one end thereof, a concentric wheel mounted for free movement upon said hub, lateral extensions on the hub and wheel forming an annular chamber between the two, one or more friction disks in said chamber connected to the hub and adapted to engage a friction member or members on the wheel, a disk slidably mounted in a central bore in the outward end of the hub extension, arms projecting from said disk through longitudinal slots in the hub extension into engagement with the friction disk or disks, a fixed nut mounted concentrically at the outward end of the hub extension, a screw passing through said nut and adapted to press the armed disk inward, and means for turning the screw.

3. The combination with a rotary shaft, of a hub fastened upon one end thereof, a concentric wheel mounted upon a ball bearing upon said hub, lateral extensions on the hub and wheel forming an annular chamber between the two, a plurality of friction disks in said chamber alternately connected to the hub and wheel, the innermost disk adapted to engage a friction surface on the wheel, a cap piece fastened to the outward end of the wheel extension, a ball bearing in said cap piece, a cone for said bearing screwed upon the end of the hub extension, a cap piece screwed into a central bore in the hub extension against said cone, a concentric nut mounted on a ball bearing in the outward end of the last named cap piece, means for holding said nut stationary, a screw passing through the nut, a disk slidably mounted in the bore of the hub extension, a ball thrust bearing between said disk and the end of the screw, arms projecting from said disk through longitudinal slots in the hub extension into engagement with the outermost friction disk, and means for turning the screw.

4. The combination with a rotary shaft, of a hub fastened upon one end thereof, a concentric wheel mounted for free rotation upon said hub, concentric clutch members mounted between the wheel and hub, and means having connection with the clutch members and concentrically mounted in the outward end of the hub and independent of the rotations thereof for actuating the clutch members.

5. The combination with a rotary shaft, of a hub fastened upon one end thereof, a concentric wheel mounted for free rotation upon said hub, concentric clutch disks mounted in a chamber formed between the hub and wheel, a longitudinally movable member concentrically mounted in the outward end of the hub and independent of the rotation thereof, and means actuated by the inward movement of said member for actuating the friction disks.

6. The combination with a motor cycle, of a hub fastened upon the motor shaft, a concentric pulley wheel mounted for free rotation upon said hub, clutch members between the hub and wheel, a screw mounted in a fixed nut concentrically at the outward end of the hub, means actuated by said screw for actuating the clutch members, and means for turning the screw operable by the rider.

7. The combination with a motor cycle, of a hub fastened upon the motor shaft, a concentric pulley wheel mounted for free rotation upon said hub, clutch members between the hub and wheel, a screw mounted in a fixed nut concentrically at the outward end of the hub, means actuated by said screw for actuating the clutch members, an arm on the screw, and means on one of the handle bars of the machine for operating said arm.

8. A clutch for motor cycles comprising a rotary shaft, a member secured on the end of said shaft and having a tubular extension in axial alinement with the shaft, spaced roller bearings on said member, a wheel carried by said bearings, friction disks carried by said member between said bearings, friction disks carried by said wheel and alternately arranged with said first-mentioned disks, a non-rotatable threaded member, a rotatable threaded member cooperating with said non-rotatable threaded member, means arranged in said tubular extension, and connecting one of said threaded members with one of said disks, whereby the disk is actuated to effect engagement and release of the disks, and means for operating said rotatable threaded member.

9. A clutch for motorcycles comprising a shaft, a member arranged on said shaft, two spaced roller bearings on said member, a wheel having a chamber therein and an interior web which is mounted on one of said bearings, an end plate secured to said wheel and closing the outer side of said chamber, said plate being mounted on the other of said bearings, friction disks carried by the wheel in said chamber, friction disks carried by said member and alternately arranged with said first-mentioned disks, a non-rotatable threaded member, a rotatable threaded member coöperating with said non-rotatable threaded member, means for holding one of said threaded members against axial movement whereby the other threaded member is moved axially by the rotation of the rotatable threaded member, and means actuated by the axial movement of said other threaded member to effect the engagement and disengagement of said disks.

10. A clutch for motorcycles comprising a shaft, a member arranged on said shaft, two spaced roller bearings on said member, a wheel having a chamber therein and an interior web which is mounted on one of said bearings, an end plate mounted on the other of said bearings and secured to said wheel, friction disks carried by the wheel in said chamber, friction disks carried by said member and alternately arranged with said first-mentioned disks, a non-rotatable threaded member, a rotatable threaded member coöperating with said non-rotatable threaded member, means for holding one of said threaded members against axial movement, whereby the other threaded member is moved axially by the rotation of the rotatable threaded member, means engaged by one of said disks and adapted to be moved to effect engagement and disengagement of the disks, and a thrust bearing between said last-mentioned means and the axially movable threaded member.

11. In a motor cycle, the combination with a rotary member thereof, of a concentric wheel mounted for free rotation on said rotary member, and provided with a chamber in one side, a removable cap piece for closing said chamber, clutch members in said chamber for engaging said wheel and said rotary member, and means comprising coöperating rotatable and non-rotatable threaded members one of which is axially movable and is connected with one of said clutch members for moving said clutch members into gripping engagement.

12. A clutch for motor cycles, comprising a rotary member, a wheel mounted for free rotation on said member and having an interiorly arranged abutment, a friction disk carried by said wheel, a friction disk carried by said rotary member and adapted to be compressed between the first mentioned disk and said abutment, and means for compressing and releasing said disk, including an axially movable disk carried by the rotary member, a non-rotatable threaded member, a rotatable threaded member, and a thrust bearing between the axially movable disk and the rotatable threaded member.

FREDERICK S. ELLETT.

Witnesses:
J. Costello,
D. H. Canfield.